United States Patent
Thacker et al.

(10) Patent No.: US 7,130,382 B2
(45) Date of Patent: Oct. 31, 2006

(54) MTS-SWITCH GENERIC VERIFICATION

(75) Inventors: Terry D. Thacker, Lawrenceburg, KY (US); Gary Thomas Metcalf, Louisville, KY (US); David Gnadinger, Louisville, KY (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 548 days.

(21) Appl. No.: 10/339,520

(22) Filed: Jan. 9, 2003

(65) Prior Publication Data

US 2004/0139126 A1   Jul. 15, 2004

(51) Int. Cl.
  *H04M 1/24* (2006.01)
  *H04M 3/08* (2006.01)
  *H04M 3/22* (2006.01)
  *G06F 9/44* (2006.01)

(52) U.S. Cl. .................. 379/9.01; 379/9; 379/15.01; 717/168

(58) Field of Classification Search .............. 379/9.01, 379/9, 15.01, 15.02; 717/168–178
See application file for complete search history.

(56) References Cited

U.S. PATENT DOCUMENTS

| | | | | | |
|---|---|---|---|---|---|
| 5,682,533 | A | * | 10/1997 | Siljestroemer | 707/200 |
| 6,385,770 | B1 | * | 5/2002 | Sinander | 717/170 |
| 6,687,901 | B1 | * | 2/2004 | Imamatsu | 717/173 |
| 6,880,086 | B1 | * | 4/2005 | Kidder et al. | 713/191 |
| 2004/0232231 | A1 | * | 11/2004 | Linton et al. | 235/385 |
| 2006/0019634 | A1 | * | 1/2006 | Hawkes | 455/411 |

* cited by examiner

*Primary Examiner*—Quoc Tran
(74) *Attorney, Agent, or Firm*—Withers & Keys, LLC (57) ABSTRACT

An apparatus, method, and computer readable medium for automatically notifying a network administrator of a mismatch between a current software version level in a telecommunications switch and a corresponding entry in a database. The apparatus includes a computer for querying the telecommunications switch for the current software version level of the switch and for querying the database, wherein the database is associated with a switch translation system and the database includes an entry associated with the software version level of the switch. The computer compares the current software version level of the switch with the database entry associated with the software version level of the switch. The method and the computer readable medium include establishing communication between a host computer and a telecommunications switch; querying the switch for the current software version level of the switch; establishing communications between the host computer and a switch translation system; querying a database associated with the switch translation system for a corresponding entry in the database associated with the software version level of the switch; storing the current software version level of the switch in a data store associated with the host computer; and storing the database entry in a data store associated with the host computer.

22 Claims, 3 Drawing Sheets

MTS-SWITCH GENERIC VERIFICATION

DESCRIPTION OF THE BACKGROUND

Regional Bell Operating Companies (RBOCs) rely on one or more switching platforms (e.g., central office switches) to provide their telecommunications network users with their existing and future communications needs. An RBOC may have several switches deployed in a given geographical region while the total number of switches across their network may total in the hundreds. For example, BellSouth Corporation currently deploys four separate switches in the state of Kentucky alone. The number of switches deployed in each state varies according to the particular communications needs of the state.

At one time switches were single-function machines designed to connect voice circuits. Today, however, switches are very sophisticated and must meet the evolutionary demands of communications services such as data, images, and personal communications. In addition, instead of being located just at the central office, the switches are now deployed across many telephone network nodes that are closer to the communications user and able to meet the user's customized needs. To meet these current and evolutionary communications needs there are several suppliers of switches such as Lucent Technologies, Nortel, and Siemens. Also, each switch supplier makes several different types of switches depending on the ultimate application and functionality required by the telecommunications network operator. For example, Lucent Technologies makes the 5ESS switch; Nortel makes the DMS SuperNode System (e.g., DMS-100/200, DMS-100/500); and Siemens makes the EWSD Digital Switching System.

Each switch includes a customized set of features designed to meet a region's existing telecommunications requirements. The features and functionality included in a particular switch are commonly in the form of software loaded in the switch. The current software version level of the switch is commonly referred to in the telecommunications industry as the "switch generic level." As switch requirements increase to meet the telecommunications needs of the user the switch suppliers provide software upgrades for each switch. Because loading new software versions in a switch is time consuming and expensive, new software is loaded only if there is adequate demand for the new features. For example, the software version level of a switch may be upgraded to offer caller ID service in a region. The software version level of the switch also may be upgraded if the government requires the telecommunications network operator to provide users with particular features that meet government mandates such as offering number pooling and 911 services. Whenever the software version of the switch is upgraded the switch generic level is increased and a database associated with the software version level of the switch is updated with new tables and fields to be populated.

The updated switch database tables and fields generally will not match the tables and fields located in the telephone switch engineering Mechanized Translation System (MTS), which is used to input and document switch translations across the network. The MTS is a specific software application supplied by Lucent Technologies, Inc., which downloads new software to telephone switches. Generally, the MTS is a database system that mirrors a substantial portion of the software in a switch. For example, the MTS mirrors the routing and billing software of the switch, which contains tables and route indexes. Therefore, if the switch generic level is upgraded, the MTS database associated with the switch must be upgraded to match the switch generic level so that the database tables and fields match. Accordingly, for the telephone network to operate properly the switch database tables and fields must match those of the MTS database. The Complex Translation Group (CTG), which is part of the Network Infrastructure Support Center (NISC) is the group primarily responsible for implementing the changes to the MTS databases when the switch generic level is updated. The CTG is responsible for adding complex translations to the switch such as completing switch translations for Centrex, area code overlays, area code splits, and new NXXs. Each CTG has a system administrator that receives orders by way of fax, phone, and e-mail. The switch translation orders are processed by the MTS. Therefore, a failure occurs when there is a mismatch between the MTS database and the switch database.

The MTS system administrator is supposed to be notified when the switch generic level is updated so that the corresponding changes can be made to the MTS database. However, there is no automatic system or method in place for automatically notifying the system administrator of the need to update the MTS database. A problem that arises when the system administrator is not notified to update the MTS database is that the CTG technicians cannot complete the switch translation procedures because of the mismatches between the two databases.

SUMMARY

In one general respect, the present invention is directed in one embodiment to an apparatus for automatically notifying a network administrator of a mismatch between a current software version level in a telecommunications switch and a corresponding entry in a database. The apparatus includes a computer for querying the telecommunications switch for the current software version level of the switch and for querying the database, wherein the database is associated with a switch translation system and the database includes an entry associated with a software version level of the switch; and wherein the computer compares the current software version level of the switch with the database entry associated with the software version level of switch.

According to another embodiment, the present invention is directed to a method for automatically notifying a network administrator of a mismatch between a current software version level in a telecommunications switch and a corresponding entry in a database. The method includes establishing communication between a host computer and the telecommunications switch; querying the switch for the current software version level of the switch; establishing communications between the host computer and a switch translation system; querying a database associated with the switch translation system for a corresponding entry in the database associated with the software version level of the switch; storing the current software version level of the switch in a data store associated with the host computer; and storing the database entry in a data store associated with the host computer.

In another general respect, the present invention is directed in one embodiment to a computer readable medium tangibly embodying a program of instructions executable by the computer to perform a method of automatically notifying a network administrator of a mismatch between a current software version level in a telecommunications switch and a corresponding entry in a database. The method includes establishing communication between a host computer and the telecommunications switch; querying the switch for the current software version level of the switch; establishing communications between the host computer and a switch translation system; querying a database associated with the switch translation system for a corresponding entry in the database associated with the software version level of the switch; storing the current software version level of the switch in a data store associated with the host computer; and storing the database entry in a data store associated with the host computer.

According to another embodiment, the present invention provides an apparatus, including a telecommunications switch. The switch includes a computer for automatically notifying a network administrator of a mismatch between a current software version level loaded in the telecommunications switch and a corresponding entry in a database, the computer comprising instructions for retrieving the current software version level loaded in the switch and for querying the database, wherein the database is associated with a switch translation system and the database includes an entry associated with a software version level of the switch; and wherein the computer compares the current software version level of the switch with the database entry associated with the software version level of the switch.

In another general respect, the present invention is directed in one embodiment to a method including establishing communications between a telecommunications switch and a switch translation system; querying a database associated with the switch translation system for a corresponding entry in the database associated with the software version level of the switch; comparing the current software version level of the switch and the database entry associated with the software version level of the switch; and notifying a telecommunications network administrator when there is a mismatch between the current software version level of the switch and the database entry associated with the software version level of the switch.

DESCRIPTION OF THE DRAWINGS

Embodiments of the present invention are described herein in conjunction with the following figures, wherein.

DESCRIPTION

Figure 1:
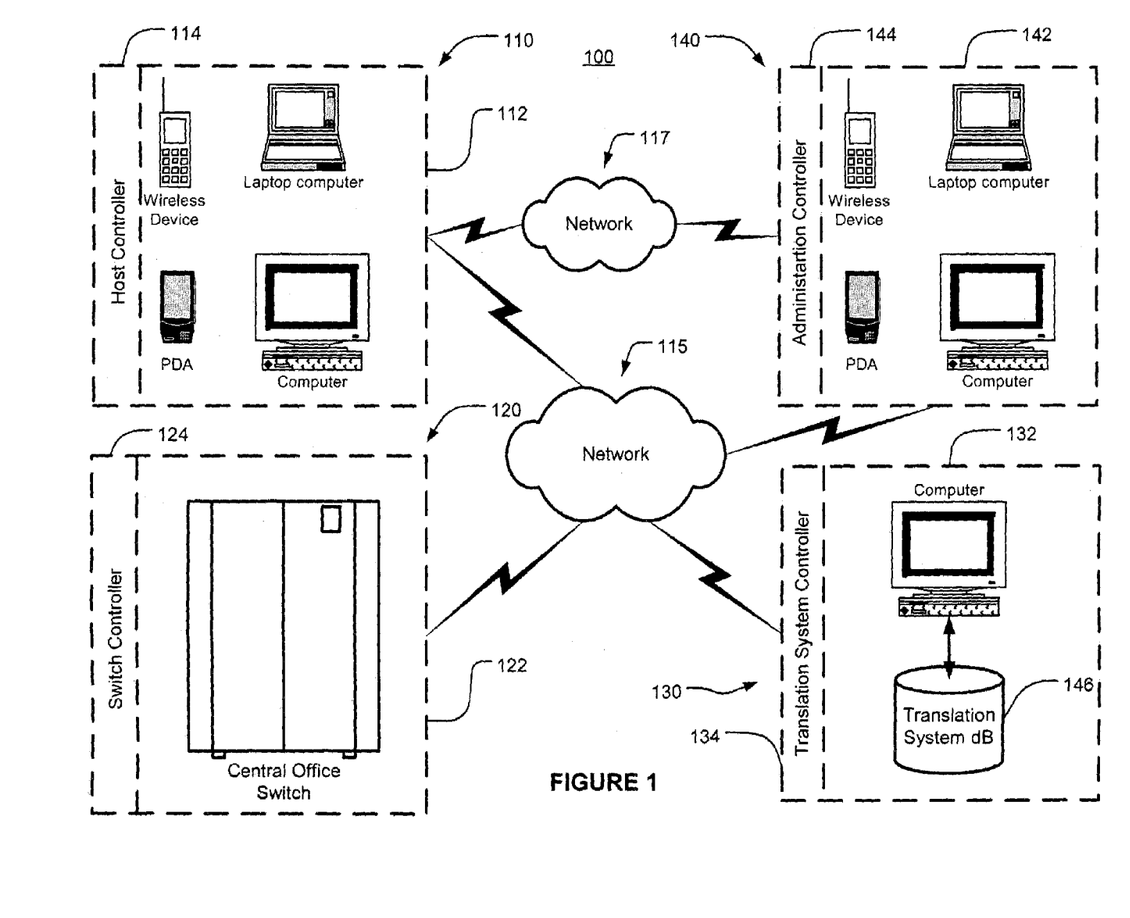
FIG. 1 is a communication system in which one embodiment of the present invention may be deployed.

A further description of the present invention will now be deferred pending a brief description of a communication system 100 illustrated in FIG. 1 in which one embodiment of the present invention may be deployed. Accordingly, FIG. 1 illustrates one embodiment of a communication system 100 for automatically notifying a telecommunications network administrator of a mismatch between a software version level identifier stored in a database associated with a telecommunications switch and the actual corresponding current software version level installed in the telecommunications switch. For brevity several elements in the figure are illustrated as monolithic structures. Nevertheless, those skilled in the art will appreciate that each structure may include numerous interconnected computing elements and/or components designed to operate according to the various aspects of the present invention.

As shown, the communications system 100 includes a host system 110 connected through a network 115 to a switch system 120. The host system 110 and the switch system 120 are configured to communicate and exchange information via the network 115. The switch system 120 may include one or more central office switches, such as, central office switches manufactured by Lucent Technologies, Nortel, and Siemens, for example. Each manufacturer provides several different types of central office switches to perform call processing functions. For example, Lucent manufacturers the 5ESS switch; Nortel manufacturers the DMS SuperNode System (e.g., DMS-100/200, DMS-100/500); and Siemens manufactures the EWSD Digital Switching System. Each switch is designed to operate at a certain performance level and provides a core of functionality based on user demands. Also, each switch is designed to receive software upgrades to provide advanced features as may be demanded by the network users. Accordingly, the switch system 120 may be associated with any type of central office switch including a single switch, a plurality of switches, or combinations of the various types of central office switches enumerated above.

In general, the host system 110 includes a computer system having hardware and/or software components for communicating with the network 115 and/or the network 117, the switch system 120, the switch translation system 130, and the administration system 140. Although the host system 110, the switch translation system 130, and the administration system 140 are shown as separate structures, it is to be understood that each of these systems 110, 130, 140 may be implemented as a single combined system or as separate systems without departing from the scope of the present invention. Accordingly, each of the systems 110, 130, 140 may include one or more general-purpose computers (e.g., personal computers, servers, and/or workstations), one or more customized special-purpose computers (e.g., devices specifically designed for a particular task and programmed to communicate with each other), or a combination of one or more general-purpose computers and one or more special-purpose computers. Furthermore, the host system 110 and the switch system 120, the switch translation system 130, and the administration system 140 may be structured to communicate using various open communications protocols (e.g., HTTP, TCP/IP, WAP, UDP) or closed communications protocols (e.g., proprietary protocols specifically designed to communicate with the central office switches). Each of the various protocols may be used to establish connections between network elements and/or to operate within or in concert with one or more other systems (e.g., the Internet and/or World Wide Web).

In one embodiment of the present invention, the host system 110 may include a host device 112 operating under the command of a host controller 114. The switch system 120 may include a switch device 122 operating under the command of a switch controller 124. The switch translation system 130 may include a device 132 operating under the command of the switch translation system controller 134. The administration system 140 may include a device 142 operating under the command of an administration system controller 144. The broken lines are intended to indicate that in some implementations, the controllers 114, 124, 134, 144, or portions thereof considered collectively, may instruct one or more elements of the devices 112, 122, 132, 142 to operate as described. Accordingly, the function of automatically notifying a telecommunications network administrator of a mismatch between a software version level identifier stored in a translation system database 146 and the actual corresponding current software version level loaded in the switch 122 may be implemented as software executing in the host system 110 and controlling one or more elements of each of the systems 110, 120, 130, 140.

An example of a device 112, 122, 132, 142 in accordance with one embodiment of the present invention is a general-purpose computer capable of responding to and executing instructions in a defined manner. Other examples include a special-purpose computer including, for example, a central office switch (e.g., Lucent 5ESS, Nortel DMS SuperNode Systems DMS-100/200, and DMS-100/500, and Siemens EWSD Digital Switching System), a switch translation system (e.g., the MTS), an automatic processing system (e.g., APRIL described hereinbelow), and/or a central office switch, a personal computer (PC), a workstation, a server, a laptop computer, a web-enabled telephone, a web-enabled personal digital assistant (PDA), a microprocessor, an integrated circuit, or any other component, machine, tool, equipment, or some combination thereof capable of responding to and executing instructions. Furthermore, each system 110, 120, 130, 140 may include a central processing engine including a baseline processor, memory, and communications capabilities. Each system 110, 120, 130, 140 also may include a communications system bus to enable multiple processors to communicate with each other. In addition, each system 110, 120, 130, 140 may include mass storage in the form of a disk drive, cartridge drive, and control elements for loading new software.

An example of a controller 114, 124, 134, 144 in accordance with one embodiment of the present invention is a software application (e.g., operating system, browser application, client application, server application, proxy application, on-line service provider application, and/or private network application) installed on a device for directing execution of instructions. Other examples include a computer program, code, a set of instructions, or some combination thereof, for independently or collectively instructing the device to interact and operate as programmed. The controller 114, 124, 134, 144 may be implemented by utilizing any suitable computer language (e.g., C\C++, UNIX SHELL SCRIPT, PERL, JAVA, JAVASCRIPT, HTML/DHTML/XML, FLASH, WINDOWS NT, UNIX/LINUX, APACHE, RDBMS including ORACLE, INFORMIX, and MySQL) and/or object-oriented techniques. The controller 114, 124, 134, 144 also may be a device, such as a workstation or PC, a microprocessor, a microcontroller, a network server, a Java virtual machine, an application-specific integrated circuit, or a programmable logic array.

The controller 114, 124, 134, 144 may be embodied permanently or temporarily in any type of machine, component, physical or virtual equipment, storage medium, or propagated signal capable of delivering instructions to a device. In particular, the controller (e.g., software application, and/or computer program) may be stored on a storage medium (e.g., disk, device, or propagated signal), readable by a computer system, such that if the storage medium is read by the computer system, the functions described herein are performed.

The network 115 may include one or more delivery systems for directly or indirectly connecting the systems 110, 120, 130, 140 to each other. Furthermore, the network 117 may include a wireless paging delivery system. Examples of delivery systems include, but are not limited to, a local area network (LAN), a wide area network (WAN), the Internet, the Web, a telephony network (e.g., analog, digital, wired, wireless, PSTN, ISDN, or xDSL), a radio network, a television network, a cable network, a satellite network, and/or any other wired or wireless communications network configured to carry data. Each network may include one or more elements, such as, for example, intermediate nodes, proxy servers, firewalls, routers, switches, adapters, sockets, and wired or wireless data pathways, configured to direct and/or deliver data.

The host system 110 communicates with the switch system 120 and the switch translation system 130 regarding information related to the software version level currently loaded in the switch 122 of the switch system 120 and the software version level identified in the translation system database 146 associated with the switch translation system 130. In one implementation, the host system 110 may include a personal computer executing a software application and the switch system 120 may include one or more central office switches 122 executing various software applications according to the features and requirements of the telecommunications services being provided by the telecommunications network operator. The host system 110 may display various graphical user interfaces (UIs), such as Web pages, that request input from and deliver content to the user. For example, the user may input requested information into a series of UIs and then be presented with a response representing the requested information.

Having described the communication system 100 in which one embodiment of the present invention may be deployed, one embodiment of the present invention will now be described. Accordingly, in one embodiment of the present invention, the communication system 100 may be employed for automatically notifying a telecommunications network administrator of mismatches between the generic software version level of the central office switch 122 with the corresponding switch generic software version level stored in the translation system database 146.

In one embodiment of the present invention the CTG group of a telecommunications network operator may utilize the host system 110 to perform the complex translations to the switch 122 such as completing switch translations for Centrex, area code overlays, area code splits, and new NXXs. Each CTG has a system administrator that receives orders by way of fax, phone, and e-mail. The switch controller 124 may include complex translations in the form of software programs residing in the switch system 120 that provide instructions to the central office switch 122 relating to routing and billing of telephone calls. These instructions include data tables and route indexes. Traditionally, written records were used to detail the information inputted in a central office switch. Keeping the written records up-to-date, however, has become a labor-intensive activity. Lucent Technologies, Inc. provides the MTS system to replace the written records. Although, the MTS system provides a level of automation, it is still time consuming and expensive to manually input the complex translations into a central office switch and the MTS.

In one embodiment of the present invention, the translation system controller 134 includes the MTS software supplied by Lucent Technologies, Inc. that instructs the switch translation system 130 to implement the various MTS functions for processing the switch translation orders. The MTS software is used to input and document switch translations and is a specific software application for downloading new software to central office switches. The translation system database 146 associated with the switch translation system 130 may be implemented as an MTS database for storing the current central office switch 122 generic software version level. The MTS database includes tables that mirror the software in the same tables located in the central office switch 122. The CTG is responsible for maintaining the MTS database synchronized with the actual central office switch 122 generic software version level.

The translation system controller 134 also may include automatic processing system software application programs for automating delivery of routing, charging, and trunking of recent change messages from the switch translation system 130 to the central office switches 122. Such applications are designed for receiving information input into the switch translation system 130, reformatting the information into machine language compatible with the particular central office switch 122 type, sending the information to the switch 122, verifying that the changes took effect, and then notifying the switch translation system 130 that the changes were completed. One example of an automatic processing system software program is supplied by Cubix Software, Inc. The Cubix automatic processing system software provides a translations switch interface for automating and controlling input translation packets into the most common telephone company central office switch types. The software application program by Cubix Software, Inc. is sold under the name APRIL, which is an acronym for Automated Processing of Recent Change Input Letters. The APRIL system software receives the information input into the switch translation system 130, reformats it into machine language appropriate for the central office switch 122 type, sends the information to the central office switch 122, verifies that the changes took effect, and then notifies the switch translation system 130 that the changes were completed. The APRIL software application program currently supports central office switches such as the Lucent 5E and 1A, the Nortel DMS, and the Siemens EWSD. The APRIL software application program also provides data verification, switch verification, audit trail, and a line of accountability for every switch translation. The APRIL software application program interfaces with the switch translation system 130 and may be driven by any software application capable of delivering packet files to the APRIL file system. In the telecommunications industry the switch translation system 130 (e.g., the MTS) in combination with the automatic processing system (e.g., APRIL software application program) is one method of inputting translations and managing records located in several Regional Bell Operating Companies (RBOCs).

The switch system 120 may include a single central office switch 122 or a plurality of central office switches 122 distributed throughout the telecommunications network. The switch controller 124 may include the central office switch software supplied by the manufacturer of the switch 122. Switches require software upgrades as new telecommunications features are introduced or as dialing plan changes are implemented as a result of regulatory agency orders. To meet these new requirements, the switch manufacturers, i.e. Lucent, Nortel, Siemens, and others, periodically release new software upgrades or downloads for their existing central office switches 122. A central office switch 122 that has been upgraded with a new version of software is said to have a new switch generic software version level. The new switch generic software version level often includes new tables and/or route indexes. The new tables and/or route indexes are generally different from the existing table field lengths in the translation system database 146.

Accordingly, when the new switch generic software version level download takes effect, the translation system database 146 structure no longer mirrors the database structure of the upgraded central office switch 122. Therefore, the switch 122 may reject translations changes that are input into the switch translation system 130. To correct or prevent this mismatch condition, the switch translation system network administrator for the state in which the switch is located must alter the translation system database 146 to reflect the new generic software version level of the switch.

One embodiment of the present invention provides an apparatus and method for automatically notifying the switch translation system network administrator operating the administration system 140. The switch translation system network administrator may be notified according to a predetermined schedule of any generic software version level changes made to any switch 122 and the corresponding translation system database 146. Because the switch translation system network administrator may be located remotely from the CTG, central office, and/or the MTS site, any of the devices 142 comprising the administration system 140 may receive the notification. Such notification may take the form of any type of communication including communication by way of electronic mail (e-mail), facsimile, telephone, wireless communication device (e.g., wireless telephone, pager, personal digital assistant), posting on a web page, and other similar modes of communication, which can be implemented on a predetermined schedule. For example, in one embodiment of the present invention notification may be transmitted to the administrator on a periodic basis such as hourly, daily, weekly, or monthly. In another embodiment, the notification also may be transmitted on an aperiodic basis such that the system according to the present invention determines the appropriate time to make the notification. Nevertheless, the scope of the present invention is not limited to a particular reporting schedule, whether periodic or aperiodic, provided that the notification is made available to the switch translation system network administrator on a timely basis.

In one embodiment of the present invention the switch translation system controller 134 software application marks any mismatches of a switch generic software version level between the central office switch 122 and the translation system database 146 with a symbol. For example, the host controller 114 may mark the mismatched entry with an asterisk (*). In one embodiment of the present invention the host system controller 114 includes a software application directing the host system 110 to schedule notifications automatically on a weekly basis on the weekends, for example. The host system controller 114 software application logs into any switch system 120 located throughout the telephone network and requests the generic software version level of the software application of the switch 122 implemented as switch controller 124. The switch generic software version level for the switch 122 is then stored in a file (e.g., a data file) by the host system 110. The software program implemented by the host system controller 114 then queries the translation system database 146 and requests the generic software version of the switch 122 stored therein. The host system 110 then determines if there exists a mismatch between the actual loaded switch generic software version level and that indicated in the translation system database 146. If there is a mismatch, in one embodiment the host system controller 114 prepares a notification e-mail to the administration system 140 providing information to the administrator that the generic software version level of the switch 122 must be updated in the translation system database 146. The notification e-mail is then transmitted on the predetermined schedule, such as weekly in this example, by way of network 115 or network 117 to the administration system 140. Following is an example of the information that may be contained in the notification e-mail.

One embodiment of the present invention is designed to operate with the Lucent 5ESS central office switches. Another embodiment of the present invention is designed to operate with the Nortel DMS central office switches. Those skilled in the art will appreciate that the scope of the present invention covers not only the specific embodiments described herein, but rather covers all other embodiments and implementation that perform the functions described herein with respect to the Lucent 5ESS and the Nortel DMS central office switches. For example, the present invention may be modified to operate with all other central office switches as may be necessary for a given application.

The host system controller 114 software application program according to one embodiment of the present invention directs the operation of the host system 110, which includes any computer that is capable of communicating with the switch system 120 and the translation system database 146. To obtain the generic software version level of the switch 122, the host system controller 114 in accordance with present invention logs into the switch system 120 and sends a query to request the current generic software version level of the switch system controller 124. The switch system 120 responds to the query and transmits a message back to the host system 110 being directed by the host system controller 114. The response from the switch system 120 is stored in a file by the host system 110.

In one embodiment of the present invention the switch system 120 includes a Lucent 5ESS central office switch identified as "kys149," for example. The host system 110 transmits a query message to the switch system 120 requesting the current generic software version level of the switch system controller 124. One example of a query message is formatted as follows:

op:version; PF  (1)

In response to the query message (1) the switch system 120 (e.g., a Lucent 5ESS central office switch identified as "ky149") sends the response message shown in TABLE 1 below. The first entry under the "Version" heading in column two "5e14(1)" is the portion of the response message that is captured by the host system controller 114 for comparison to the value stored in the MTS database 146. This portion of the message provides the information necessary to determine the switch generic software version level of the switch 122 directing the operation of the Lucent 5ESS switch.

TABLE 1

```
S41E-505348309 02-10-17 14:27:30 439179 MTCE wkpkvle
       M OP VERSION             Sep 24 21:23
PARTITION          VERSION           BWM
ECD                5e14(1)02.00
/                  5e14(1)02.00      BWM02-0003
/etc               5e14(1)02.00      BWM02-0003
/unixa             5e14(1)02.00      BWM02-0003
/no5odd            5e14(1)02.00      BWM02-0003
/no5text/im        5e14(1)02.00      BWM02-0003
/no5text           5e14(1)02.00      BWM02-0003
/diag              5e14(1)02.00      BWM02-0003
/no5text/rcv/SODD  5e14(1)02.00      BWM02-0003
       /no5text/rcv/SODD 5e14(1)02.00 BWM02-0003
                   DISK CONFIGURATION
```

The host system 110 also queries the translation system database 146 to retrieve the stored value of the generic software version level of the switch 122 of interest, e.g., the Lucent 5ESS switch. Once the host system 110 retrieves the value of the generic software version level of the switch 122 stored in the translation system database 146, the system 110 compares it to the actual generic software version level of the switch 122 retrieved from the switch system 120. By way of example, TABLE 2 shows a comparison of the generic software versions between the transaction system database 146 and the switch 122 in a plurality of Lucent 5ESS central office switches distributed throughout a telecommunications network. In one embodiment of the invention, a mismatch between the actual generic software version level of the switch 122 and the generic level value stored in the translation system database 146 is identified by placing a symbol such as an asterisk (*) next to the value stored in the "Office Name" field.

KYNISC

TABLE 2

MTS to Switch Generic Comparison Table

| Office Name | MTS Generic | Switch Generic |
|---|---|---|
| kyan24 | 5e14(1) | 5e14(1)02.00 |
| kybe5e | 5e14(1) | 5e14(1)02.00 |
| kybrse | 5e14(1) | 5e14(1)02.00 |
| kycrbn | 5e14(1) | 5e14(1)02.00 |
| kycw24 | 5e14(1) | 5e14(1)02.00 |
| kydavl | 5e14(1) | 5e14(1)02.00 |
| kyfc23 | 5e14(1) | 5e14(1)02.00 |
| kygrtw | 5e14(1) | 5e14(1)02.00 |
| kyjt26 | 5e14(1) | 5e14(1)02.00 |
| kyoa5e | 5e14(1) | 5e14(1)02.00 |
| kypdlo | 5e14(1) | 5e14(1)02.00 |
| kypkvl | 5e14(1) | 5e14(1)02.00 |
| kysh44 | 5e14(1) | 5e14(1)02.00 |
| *kys149 | 5e13(2) | 5e14(1)02.00 |
| kysm5e | 5e14(1) | 5e14(1)02.00 |
| kysntn | 5e14(1) | 5e14(1)02.00 |
| kywe42 | 5e14(1) | 5e14(1)02.00 |

Thu Oct 17 10:20:47 EDT 2002

Accordingly, with reference to TABLE 2, in response to the query message (1), the LUCENT 5ESS central office switch "kys149" includes its actual generic software version level "5e14(1)." As shown in TABLE 2 above, there is a mismatch between the central office switch "kys149" and the generic software version level stored in the translation system database 146 corresponding to the "kys149" switch. Once the host controller 114 determines that there is a mismatch, it instructs the host system 110 to transmit a notification message to the administrator system 140 notifying the MTS administrator that a mismatch exists and that the MTS administrator must update the generic software version level corresponding to the switch 122 in the MTS database 146.

For a Nortel DMS central office switch, the response to a query for the switch's generic software version level of the switch 122 is as follows:

2002/09/14 23:05  RED FLAG  H3Q124 Winchester_KY LET0014 07/DEC/01
>table ofcstd
TABLE: OFCSTD
>pos bcs_number The automatic processing system (e.g., the APRIL software application program) includes a database of all offices having an association with a particular state. Accordingly, the host system 110 may obtain a list of central office switches 122 distributed throughout each state. The host system 110 may then access the switches 122 contained in the list and the corresponding translation system databases 146 and output a file containing the generic software version level of the switches 122. As discussed above, the host system 110 compares these results, marks the mismatches, and outputs the data to a file. The file may then be e-mailed to each translation system administrator for the particular state.

Figure 2:
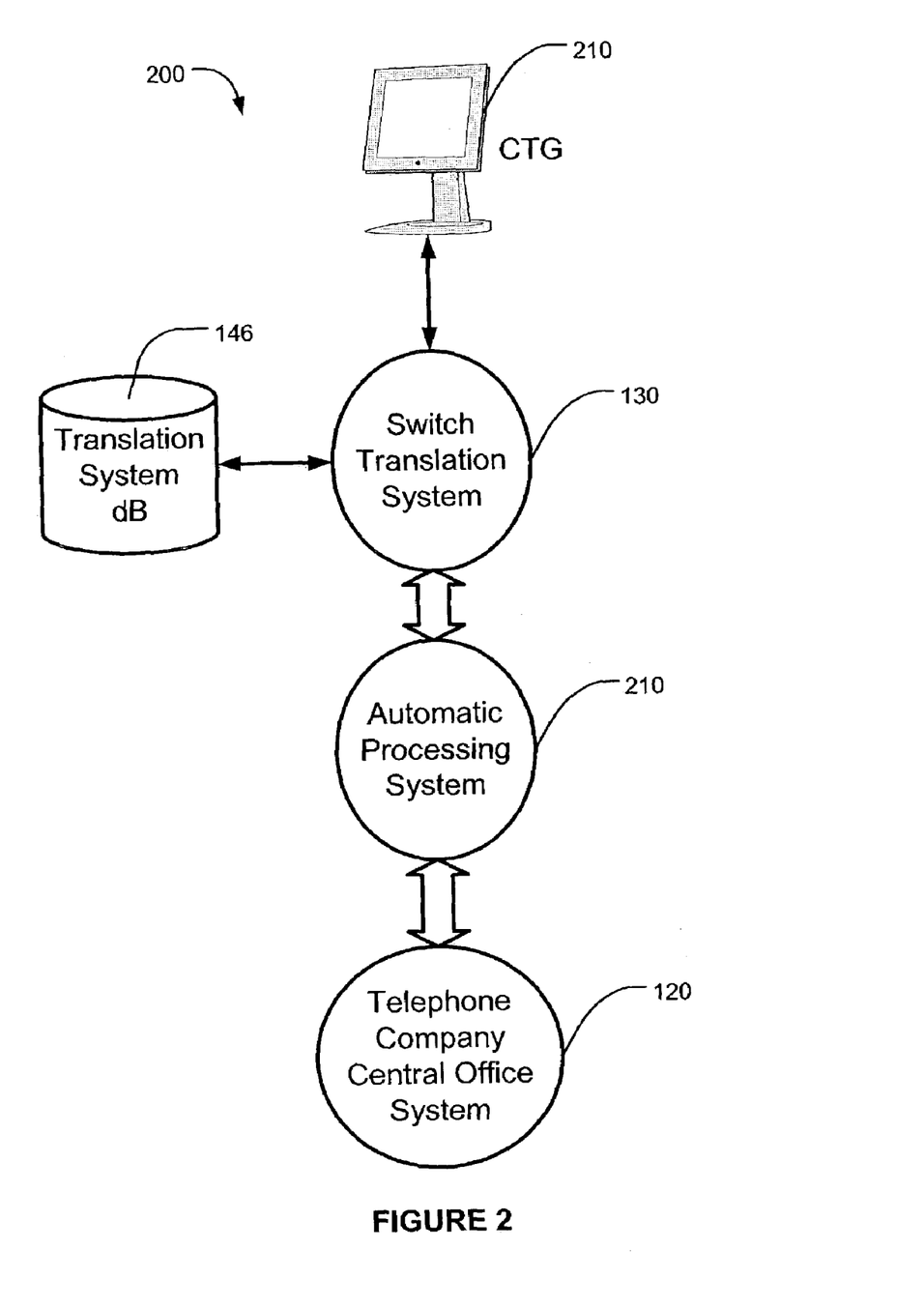
FIG. 2 is a diagram of one embodiment of a system according to the present invention.

FIG. 2 is a diagram of one embodiment of a system 200 according to the present invention. Initially, telecommunications company personnel 210 (e.g., electronic technicians) in the CTG group input routing and billing changes in the central office system switch 122 by accessing the switch translation system 130 (e.g., the MTS) using the host system 110. The host system 110 is then used to access the mirror image translation system database 146 of the intended central office. Data packets containing the changes are developed and sent to an automatic processing system 210 (e.g., the APRIL software application program) where the data are reformatted into an appropriate language for the central office system switch 122. The automatic processing system 210 then connects to the central office system switch 122 and inputs the reformatted data contained in the data packets into the switch 122. Errors and/or completion notifications are then sent to the technician and to the switch translation system 130, where the mirror image translation system database 146 is updated and the changes are made permanent in the central office's records.

Figure 3:
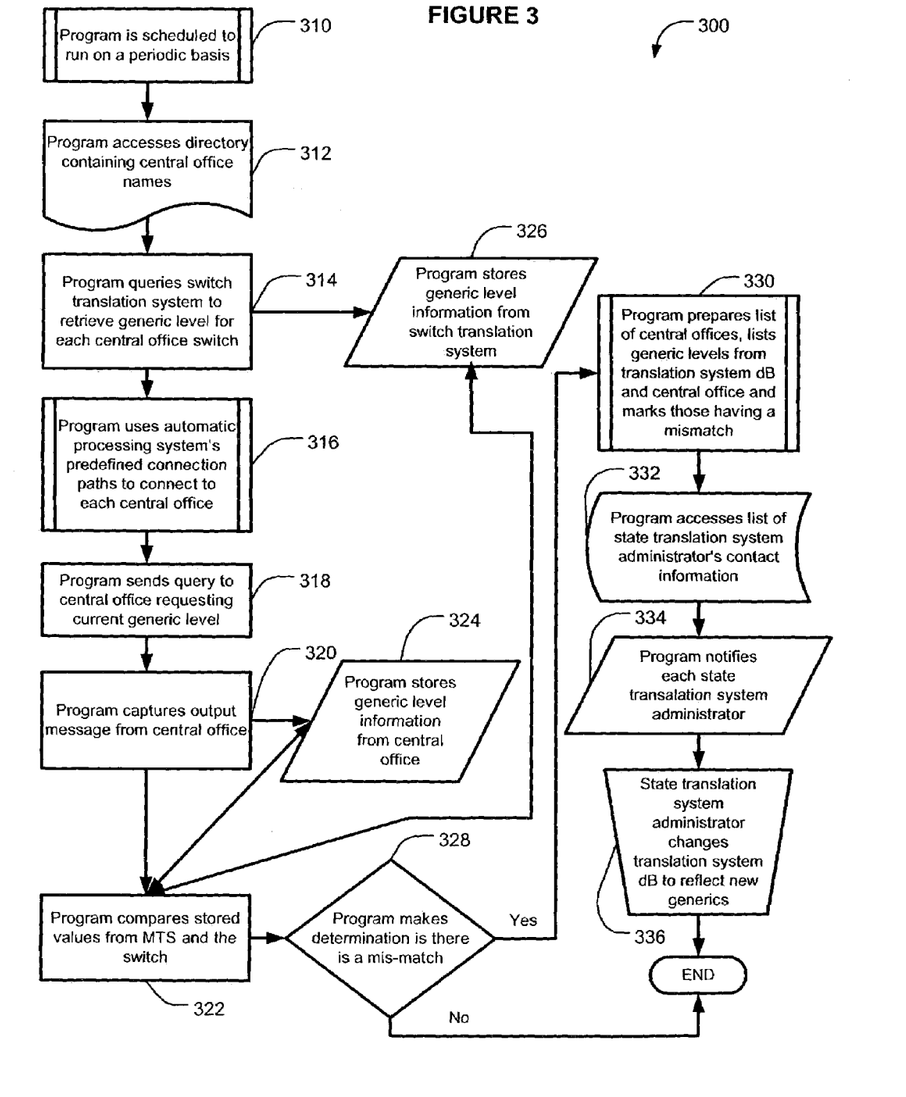
FIG. 3 is a flow diagram of one embodiment of the present invention.

FIG. 3 is a flow diagram 300 of one embodiment of the operation of the host controller 114 implemented as a software application instructing the operation of the host device 112 such that the host system 110 may implement the functions according to the present invention. The host controller 114 software application program is scheduled to run on a predetermined periodic basis such as hourly, daily, or weekly, or on an aperiodic basis (310). Once the scheduled period is set up, the host controller 114 accesses a directory containing central office names distributed throughout the telecommunications network (312). Once the host controller 114 software application program instructions are executed, the host system 110 queries the translation system database 146 to retrieve the stored generic software version level of the switch 122 for each central office contained in the directory (314). Those skilled in the art will appreciate that the host system 110 may retrieve information related to a particular central office switch or a predetermined subset of the central office switches contained in the directory. In one embodiment of the present invention, the host system 110 stores the indicator of the generic software version level of the switch 122 retrieved from the switch translation database 146 (326).

In one embodiment of the present invention the host system 110 uses the automatic processing system 210 for receiving information input into the switch translation system 130, reformatting it into machine language appropriate for the switch system 120, sending the information to the switch system 120, verifying that the changes took effect, and then notifying the switch translation system 130 that the changes are completed. One such automatic processing system 210, for example, is the APRIL system discussed hereinbefore. The scope of the invention, however, is not limited to methods employing the APRIL system because the code of the host controller 114 can be adapted to work with any automatic processing system that enables the host system 110 to communicate with the switch system 120. Accordingly, the host system 110 may use the predefined connection paths established by the automatic processing system 210 to connect to each switch system 120 (316).

Once a connection path to the switch system 120 is established, the host system 110 sends a query to the central office switch requesting its current generic software version level (318). The host system 110 then captures the output message from the switch system 120 (320). In one embodiment of the present invention, the host system 110 stores the generic software version level information from the central office switch 122 in a data store associated with the host system 110, for example (324). Once the host system 110 receives the generic software version level information from the central office switch 122, it compares the received value with the values retrieved from the switch translation database 146 (322).

When the host system 110 compares the two values it determines if there is a mismatch between the two (328). If there is no mismatch, the host controller 114 ends execution of instructions and re-initiates execution according to the predetermined schedule. If there is a mismatch, however, the host system 110 prepares a list of central offices, lists the generic software version levels of the central office switches 122 and the switch translation database 146 and marks those having mismatches (330). Once the mismatches have been identified and marked, the host system 110 accesses the contact information of the translation system administrator operating the administration system 140 in each state (334). The contact information may include e-mail address, facsimile number, telephone number, wireless communication device, address or number (e.g., wireless telephone, pager, personal digital assistant), posting on a web page, and other similar modes of communication. In one embodiment of the present invention, the MTS system administrator is contacted by way of e-mail. Accordingly, once the state MTS system administrator has been notified, it is his responsibility to change the switch translation database 146 to reflect the current generic software version levels of each switch 122 (336).

Those of ordinary skill in the art will recognize that many modifications and variations of the present invention may be implemented. The foregoing description and the following claims are intended to cover all such modifications and variations. Furthermore, the materials and processes disclosed are illustrative, but are not exhaustive. Other materials and processes may also be used to make devices embodying the present invention.

The invention claimed is:

1. An apparatus for automatically notifying a network administrator of a mismatch between a current software version level in a telecommunications switch and a corresponding entry in a database, comprising:
    a computer for querying the telecommunications switch for the current software version level of the switch and for querying the database, wherein the database is associated with a switch translation system and the database includes at least one table comprising a plurality of fields for storing an entry, the entry identifying a software version level of the switch; and
    wherein the computer compares the current software version level of the switch with the stored database entry identifying the software version level of the switch.

2. The apparatus of claim 1, wherein the computer transmits a notification message to a network administrator when there is a mismatch between the current software version level of the switch and the database entry.

3. The apparatus of claim 2, wherein the computer transmits the notification message on a predetermined schedule.

4. The apparatus of claim 3, wherein the predetermined schedule is periodic and is selected from the group consisting of hourly, daily, weekly, and monthly.

5. The apparatus of claim 2, wherein the computer transmits the notification message via e-mail.

6. The apparatus of claim 2, wherein the computer transmits the notification message via a wireless device.

7. The apparatus of claim 2, wherein the computer transmits the notification message via facsimile.

8. The apparatus of claim 1, wherein the computer is adapted for establishing communications with the switch over a network.

9. The apparatus of claim 8, wherein the network is a communications network configured to carry data and is selected from the group consisting of a local area network (LAN), wide area network (WAN), the Internet, the Web, an analog telephony network, a digital telephone network, a wired telephony network, a wireless telephony network, a PSTN telephony network, an ISDN telephony network, an xDSL telephony network, a radio network, a television network, a television network, cable network, and a satellite network.

10. A method for automatically notifying a network administrator of a mismatch between a current software version level in a telecommunications switch and a corresponding entry in a database, comprising:
    establishing communication between a host computer and the telecommunications switch;
    querying the switch for the current software version level of the switch;
    establishing communications between the host computer and a switch translation system;
    querying a database associated with the switch translation system for a corresponding entry in the database for identifying the software version level of the switch, wherein the database includes at least one table compromising a plurality of fields for storing the entry;
    storing the current software version level of the switch in a data store associated with the host computer; and
    storing the database entry in a data store associated with the host computer.

11. The method of claim 10, further comprising comparing the current software version level of the switch and the database entry.

12. The method of claim 11, further comprising notifying a telecommunications network administrator when there is a mismatch between the current software version level of the switch and the database entry.

13. The method of claim 12, further comprising synchronizing the database entry and the current software version level of the switch when the host computer determines a mismatch between the database entry and the current software version level of the switch.

14. The method of claim 12, wherein notifying the telecommunications network administrator further comprises transmitting an e-mail message to the administrator.

15. The method of claim 12, wherein notifying the telecommunications network administrator further comprises transmitting a wireless message to the administrator.

16. The method of claim 12, wherein notifying the telecommunications network administrator further comprises transmitting a facsimile message to the administrator.

17. The method of claim 10, further comprising:
    accessing a directory containing the names of a plurality of switches distributed in a telecommunications network;
    establishing communications with each of the plurality of switches; and
    querying each of the plurality of switches for a current software version level of each switch in the plurality of switches.

18. The method of claim 17, further comprising:
    accessing a directory containing the names of a plurality of switch translation systems associated with each switch in the plurality of switches;
    establishing communications with each of the plurality of switch translation systems;
    querying a plurality of databases associated with each of the plurality of switch translation systems for corresponding entries in the plurality of databases of software version levels of each of the plurality of switches;
    storing the software version levels of each of the plurality of switches in a data store associated with the host computer; and
    storing the plurality of database entries in a data store associated with the host computer.

19. The method of claim 18, further comprising:
    comparing the current software version level of each of the plurality of switches with the corresponding entries in each of the plurality of databases of the software version levels of each of the plurality of switches.

20. A computer readable medium tangibly embodying a program of instructions executable by a computer to perform a method of automatically notifying a network administrator of a mismatch between a current software version level in a telecommunications switch and a corresponding entry in a database, the method comprising:
    establishing communication between a host computer and the telecommunications switch querying the switch for the current software version level of the switch;
    establishing communications between the host computer and a switch translation system;
    querying a database associated with the switch translation system for a corresponding entry in the database for identifying the software version level of the switch, wherein the database includes atleast one table comprising a plurality of fields for storing the entry;
    storing the current software version level of the switch in a data store associated with the host computer; and
    storing the database entry in a data store associated with the host computer.

21. An apparatus, comprising:
    a telecommunications switch, comprising:
        a computer for automatically notifying a network administrator of a mismatch between a current software version level loaded in the telecommunications switch and a corresponding entry in a database, the computer comprising instructions for retrieving the current software version level loaded in the switch and for querying the database, wherein the database is associated with a switch translation system and the database includes atleast one table comprising a plurality of fields for storing an entry, the entry identifying software version level of the switch; and
        wherein the computer compares the current software version level of the switch with the database entry.

22. The apparatus of claim 21, wherein the computer transmits a notification message to a network administrator when there is a mismatch between the current software version level of the switch and the database entry associated.

* * * * *